UNITED STATES PATENT OFFICE.

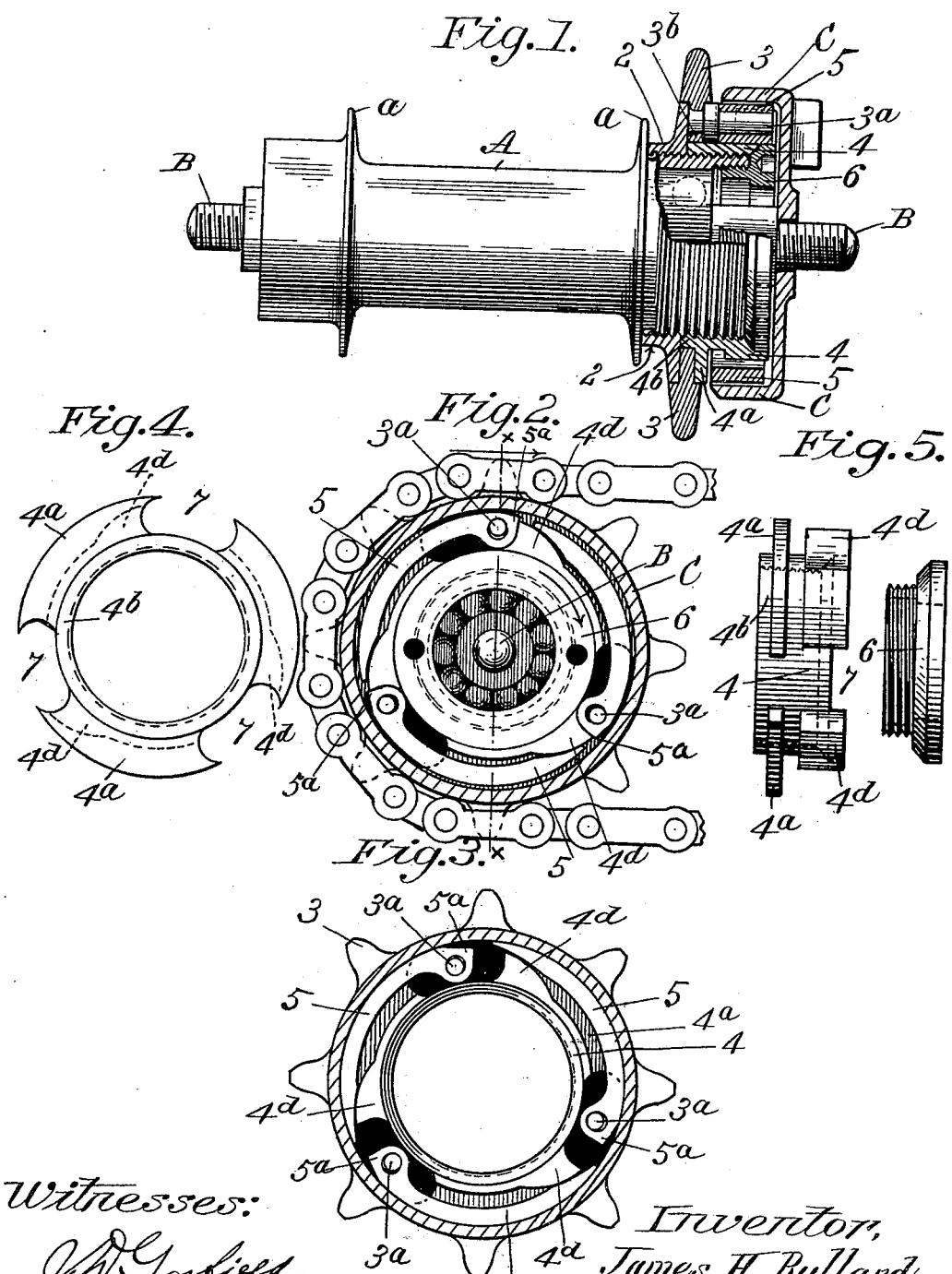

JAMES H. BULLARD, OF SPRINGFIELD, MASSACHUSETTS, ASSIGNOR OF ONE-HALF TO HENRY A. CHAPIN, OF SAME PLACE.

BRAKE FOR BICYCLES.

SPECIFICATION forming part of Letters Patent No. 623,498, dated April 18, 1899.

Application filed May 7, 1897. Serial No. 635,499. (No model.)

*To all whom it may concern:*

Be it known that I, JAMES H. BULLARD, a citizen of the United States of America, residing at Springfield, in the county of Hampden and State of Massachusetts, have invented new and useful Improvements in Brakes for Bicycles, of which the following is a specification.

This invention relates to bicycle-brakes and is in the nature of an improvement on my invention filed February 3, 1897, Serial No. 621,729, and has for its object the production of a brake for bicycles and similar vehicles in which the frictional contact of the brake element rotating with the hub of the wheel to which it is applied with the non-rotating brake element is increased automatically by any increase in the speed of rotation of the said rotating element after it has been brought in contact with the non-rotating element by the rider to check the speed of the bicycle.

A further object of the invention is to simplify the construction of the brake and to provide for a more perfect contact between the rotating and the non-rotating brake elements and to provide means for positively holding the rotating brake element out of contact with the non-rotating element when the brake is not in use, or, more properly, while power is being applied to the cranks of the bicycle to propel it forward; and the invention consists in the construction and arrangement of the parts, all as hereinafter specified, and pointed out in the claims.

In the drawings forming part of this specification, Figure 1 is a side elevation of a bicycle-wheel hub, showing, partly in section, the sprocket end of said hub, to which my improved brake is applied. Fig. 2 is an end elevation of the sprocket end of the hub illustrated in Fig. 1, with the stationary case inclosing the brake-shoes in section. This figure shows the brake elements in their inoperative position. Fig. 3 is an end view of the brake elements and sprocket-wheel removed from the hub and showing the brake parts in operative position or "set." Fig. 4 is a view of the back side of the cam-piece against which the tapered points of the brake-shoes are moved to bring the latter into action to set the brake. The opposite side of said cam-piece is shown in Fig. 2. Fig. 5 is an edge view of the cam-piece shown in Fig. 4 and the check-nut which retains it in position on the hub of the wheel.

Referring to the drawings, A represents a bicycle-wheel hub having the spoke-flanges $a$ and supported for rotation on the axle B in any suitable manner. The sprocket or driving wheel end of said hub from the spoke-flange outward is screw-threaded with a left-hand thread. 2 is a flange which is screwed thereon tightly against said spoke-flange $a$.

The sprocket or driving wheel 3 is made without any "hub," properly speaking. (See Fig. 1.) A web $3^b$ is formed in said sprocket by turning an annular depression in opposite sides of said sprocket of a depth and diameter about equal to the thickness and diameter of the flange 2. A cam-piece 4, suitably threaded to screw onto the outer end of said hub, has an annular hub-like projection $4^b$ on the side thereof which lies next to said flange 2 when the parts are in their proper position on said hub. Said projection $4^b$ enters a circular central opening in the web $3^b$ of the sprocket 3, the latter fitting loosely on said projection. Said cam-piece 4 has a flange $4^a$ thereon having portions thereof cut away, leaving the openings 7 therein, as clearly shown in Fig. 4. The outside diameter of said flange $4^a$ is the same as that of the flange 2 and fits freely within the annular depression in the side of said sprocket-wheel. Said sprocket-wheel 3 has pins $3^a$ rigidly fixed in the web $3^b$ thereof in such positions that when the latter is placed on the hub-like projection $4^b$ of the cam-piece 4 the said pins will project through said openings 7 in said flange $4^a$ and at right angles thereto. When said sprocket-wheel has been placed in position on said hub-like projection $4^b$ of the cam-piece 4, the latter is screwed onto the end of the hub and up against the face of the flange 2. Said hub projection $4^b$ on said cam-piece is of about the same width as the thickness of the web $3^b$ of the sprocket-wheel, and when the said cam-piece 4 is screwed up tightly, so that the projection thereon abuts against the face of the flange 2, the web of the sprocket is clamped with sufficient force to apply a certain resistance to its rotation between said flanges. After said cam-piece 4 has been screwed up to its proper position a check-nut 6 (see Figs. 1, 2, and 5) is screwed into the end of the hub, which is provided with a right-hand thread to receive it, and rigidly holds said cam-piece in position, the latter being counterbored, as shown, to receive said nut 6, the outer end of which is substantially flush with the end of the cam-piece 4. The countersunk head of said check-nut also serves as a support for that part of the cam-piece which overhangs the end of the hub. On said cam-piece 4 are three cam projections $4^d$, equally spaced around its periphery and projecting at right angles to the axis of the hub. The slightly-curved inclined surfaces of these projections $4^d$ incline downwardly toward the pins $3^a$, fixed in the sprocket, as stated, and on which pins the brake-shoes 5 are loosely supported by one end, and whose opposite ends (which have a tapered under surface extending from their points backward) rest on the inclined surfaces of said cam projections. It will be observed that these brake-shoes are thus connected to the sprocket and move with it when the latter is partly rotated on its hub to set or to release the brake. It is not essential that said brake-shoes should have their ends made tapering, though that is the preferred construction. The highest ends of said cam projections are located on a line with one end of the openings 7 in the flange $4^a$, and the pins $3^a$ in the sprocket-wheel, which project through said openings, abut against said flange $4^a$ and the ends of the brake-shoes 5, supported on said pins, abut against the ends of the cam projections $4^d$ when the sprocket is being rotated to drive the wheel forward. Positive engagement of the sprocket with the hub to drive the wheel forward is thus provided, the cam-piece 4 being rigidly secured on said hub.

By forming that end of the brake-shoes supported on the pins $3^a$, as shown in the drawings, with a portion thereof substantially at right angles to the exterior surface of the brake-shoe and by giving the ends of the cam projections $4^d$ which adjoin the pins $3^a$ a similar shape it is seen that when the sprocket-pins $3^a$ engage the flange $4^a$ of the cam-piece 4 to drive the wheel forward the squared end of the shoe will abut against the upper end of the cam projection $4^d$ just a little before the rounded end of the brake-shoe comes to a seat on the curved base of the projection $4^d$, and by reason of the contact of the upper squared end of the brake-shoe with said projection, as aforesaid, the opposite end of the shoe is depressed and held in contact with the cam projections $4^d$. This construction prevents the brake-shoes from moving out into contact with the non-rotatable case C by centrifugal action when the machine is being driven forward. Fig. 2 shows the brake-shoes thus held out of contact with the case C, the space between the outer surface of the shoes and the interior of the rim of the case being somewhat exaggerated for the sake of clearness. The case C is made of any suitable metal and is provided with a rim of sufficient depth to inclose the brake-shoes. The interior diameter of the case is the same as that of a circle formed by the three brake-shoes when they are moved into action to set the brake. Said case is maintained in a position concentric with the hub of the wheel by the axle of said hub, which passes through a hole centrally located in the case. A lug is cast on the exterior of the case, which engages with the frame of the bicycle, and is thereby prevented from rotating when the shoes 5 are moved into frictional contact therewith.

It will be observed that the hole in that end of the brake-shoes supported on the pins $3^a$ is elongated in a direction transverse to the length of the said shoe. The object of this elongation is to permit that end of the brake-shoe to move outwardly against the rim of the case C when the brake-shoe is moved back and its tapered end rides up on the cam projection $4^d$ and engages the rim of the case. The construction of the operating parts is such that there is a strong leverage exerted on the heel of the shoe to pry it out against the rim of the case by reason of the engagement of the extreme point of the shoe with the case, the cam projection 4 behind the point acting as the fulcrum of the lever.

Fig. 3 shows the brake-shoes in contact with the case C and clearly illustrates what is above set forth.

While the drawings show and the specification refers to three brake-shoes, either two or four would be equally applicable to this construction; but the strain is distributed better by the number shown herein.

It is of course obvious that instead of the pins $3^a$, secured in the sprocket-wheel, projections may be made on said sprocket integral therewith, should it be more economical to do so, or the brake-shoes may be made with integral projections thereon, representing the pins $3^a$, which may engage with radially-elongated holes in the web of the sprocket instead of constructing the shoes, as shown in the drawings, with holes through them for the reception of the pins fixed on the sprocket.

The operation of this brake is as follows: The curved arrow near the sprocket-wheel, Fig. 2, indicates the direction of rotation of the driving-wheel when moving forward. To apply the brake, back pressure is applied by the rider to the pedals of the bicycle, whereby through the chain the sprocket 5 on the rear hub is partially rotated thereon and the brake-shoes supported on the pins on said sprocket-wheel are moved backward, (as compared to the normal direction of the rotation of the hub,) and the tapered points of said shoes, which lie normally on the cam projections $4^d$, are forced up the inclined surfaces of said projections, and their outer surfaces of said shoes thereby brought into frictional contact with the interior surface of the rim of said case C. It is to be remembered that this case C is the non-rotatable brake element, and the brake-shoes, which constitute the rotatable element, continue their revolutions in frictional contact therewith after the brake is set until the wheel is brought to a stop. It is seen, therefore, that after contact between the said brake-shoes and the rim of the case has been effected the resistance to the continued rotation of said shoes is in a direction that tends to force the points of said brake-shoes still farther up the inclined surface of the cam projections $4^d$, and thus automatically increase the frictional resistance between the brake-shoes and the rim of the case. The inclined surfaces of the cam projections are made sufficiently abrupt to prevent any possibility of the wedging of the point of the brake-shoes between the said projections and the rim of the case. It is obvious, therefore, that should a rider start to coast down a hill, for instance, with the brake insufficiently set to hold the bicycle down to a proper rate of speed any marked acceleration of speed would produce sufficient increased friction between the brake-shoes and the case to cause the said shoes to move slightly up the inclined surfaces of the cam projections, and thereby set the brake more powerfully and check the speed of the bicycle. The brake thus becomes automatic in its operation once it has been brought into action and controls the speed of the bicycle without assistance from the rider.

To release the brake, it is only necessary to exert pressure on the pedals in a direction to drive the bicycle forward, which will cause the sprocket to be rotated on its hub in the direction of the movement of the wheel, and thereby draw the brake-shoes off from the cam projections and out of contact with the case.

As stated, the pins in the sprocket-wheel positively engage the cam-piece 4, and simultaneously when the sprocket is rotated, as stated, the heel of the brake-shoes abuts against the ends of the projections $4^d$, and the points of said shoes are thereby held out of engagement with the case as long as pressure is exerted on the pedals of the bicycle to drive it forward.

Having thus described my invention, what I claim, and desire to secure by Letters Patent, is—

1. A brake mechanism for bicycles consisting of a sprocket or driving wheel, a support therefor, said sprocket-wheel being rotatable on its support, a rotatable brake element consisting of two or more rigid segment-shaped brake-shoes having a loose pivotal connection with said sprocket and engaging said support, cam projections between said shoes and said support whereby, by the rotational movement of said sprocket relative to said support, each of said brake-shoes will be moved bodily away from, and concentrically with, said support, a stationary case inclosing said brake-shoes, and means for rotating said sprocket-wheel.

2. A brake mechanism for bicycles consisting of a sprocket or driving wheel, a support therefor, said sprocket-wheel being rotatable on its support, a rotatable brake element consisting of two or more rigid segment-shaped brake-shoes having a loose pivotal connection with said sprocket and engaging said support, cam projections between said shoes and said support whereby, by the rotational movement of said sprocket relative to said support, each of said brake-shoes will be moved bodily away from, and concentrically with, said support; a stationary case inclosing said brake-shoes, means for effecting the abutment of said brake-shoes against said support by forward-pedaling action, whereby they are moved bodily on their said loose pivotal connections against said support, during said forward-pedaling action, combined with means for rotating said sprocket.

3. A brake mechanism for bicycles comprising a revoluble hub, a sprocket-wheel on said hub and revoluble for a limited distance thereon, a stationary friction-ring, brake-shoes having a radially-sliding pivotal connection with said sprocket-wheel, whereby said brake-shoes are brought into concentric frictional engagement with said friction-ring, and lugs on said hub adapted to engage and force the brake-shoes against the friction-ring when the rotation of the sprocket-wheel is retarded, substantially as described.

JAMES H. BULLARD.

Witnesses:
H. A. CHAPIN,
K. I. CLEMONS.